UNITED STATES PATENT OFFICE.

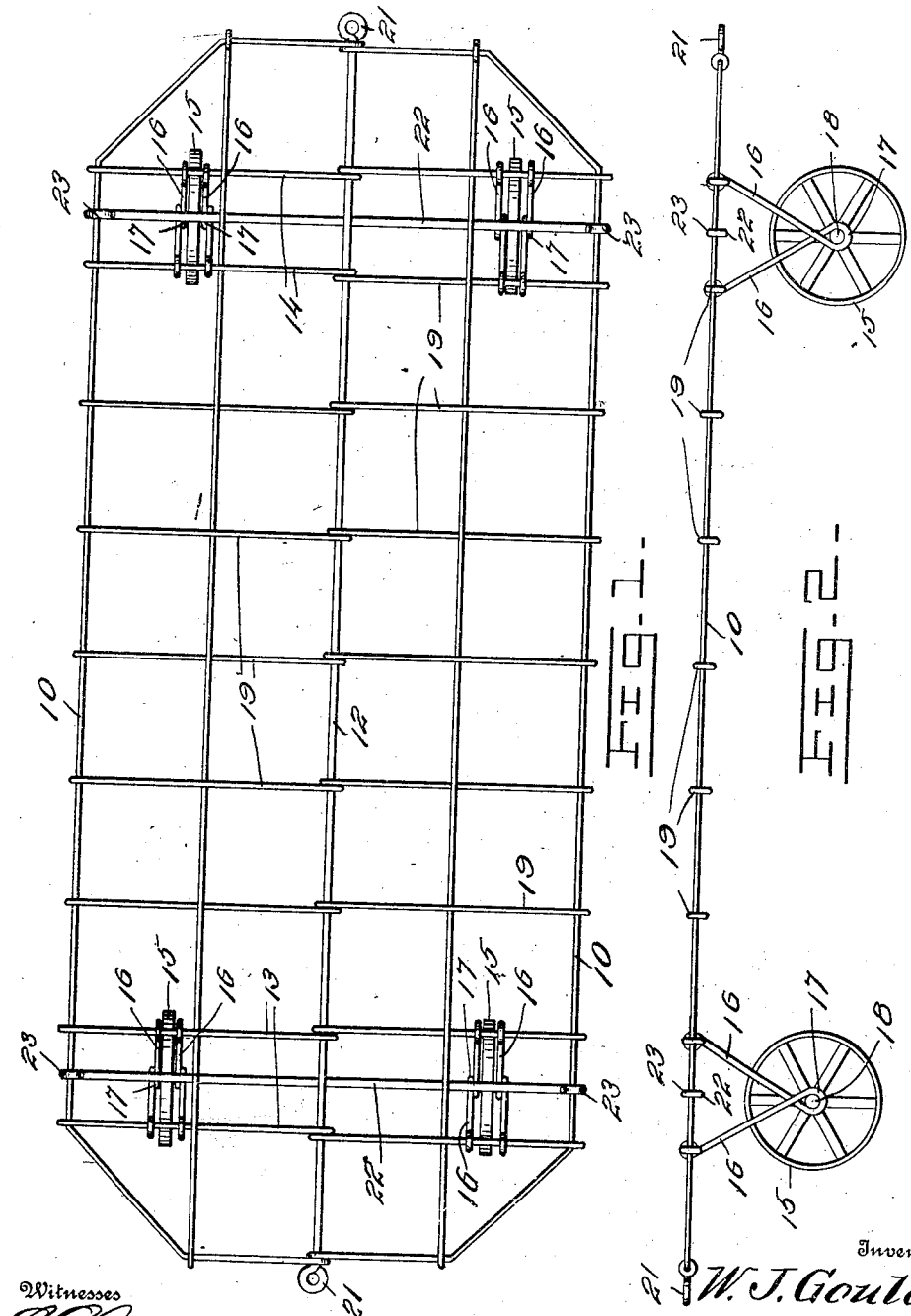

WILLIAM J. GOULD, OF EL RENO, OKLAHOMA.

SACK-CARRIER.

No. 920,453.　　　　　Specification of Letters Patent.　　　Patented May 4, 1909.

Application filed August 18, 1908. Serial No. 449,110.

*To all whom it may concern:*

Be it known that I, WILLIAM J. GOULD, a citizen of the United States, residing at El Reno, in the county of Canadian and State of Oklahoma, have invented certain new and useful Improvements in Sack-Carriers, of which the following is a specification.

This invention relates to trucks, having special reference to a truck which is to be utilized by cotton pickers.

An object of this invention is to construct a truck which will adapt itself to uneven ground and which will ably support the sack used by the pickers to contain the cotton which they pick.

Another object of this invention is to construct a truck of this nature so that it may be folded to occupy but small space for the purpose of transportation to and from the field of cotton.

A further object of this invention is to provide a truck of this character that will be strong, durable and simple of construction, so that it will withstand the usual conditions under which a device of this nature is subjected and at the same time be light and easy to manipulate.

Other objects and advantages will be apparent from the following description and it will be understood that changes in the specific structure shown and described may be made within the scope of the claims without departing from the spirit of the invention.

In the drawings forming a portion of this specification, and in which like numerals of reference indicate similar parts in the several views, Figure 1 is a top plan view of the truck, Fig. 2 is a side elevation of the same.

Referring now to the drawings in detail, 10 designates the main frame of the truck which is preferably of rectangular formation and is constructed of heavy wire or strap iron and which is divided into two sections which are hinged longitudinally of one another.
Intermediately disposed upon the frame 10 is a rod 12 which forms the pivotal support for the two sections. The sections are hingedly supported upon the rod 12 by turning the extremities of the frame 10 about the rod 12 to form eyes thereon. The sections of the truck are constructed with two pairs of transversely disposed braces 13 and 14 which are secured at their ends in the frame 10 for the purpose of supporting the wheels 15 of the truck. The rods 13 and 14 support depending V shaped brackets 16 which are disposed in pairs across the rods 14 and 15 and which are provided with suitable journals 17 for the reception of the wheel axles 18. The braces 16 are secured to the transverse braces 13 and 14 by having their upper extremities turned over upon the braces 13 and 14. The frame 10 is reinforced by a plurality of transversely disposed bars 19, which are positioned approximately six inches apart throughout the length of the frame 10. The bars 19 are hingedly supported at their inner extremities upon the rod 12 to allow the frame 10 to be folded so as to cause one of the sections to overlap and lie upon the upper face of the opposite section. The wheels 15 are disposed at the four corners of the frame 10 upon which are mounted cross rods 13 and 14. The whole device is constructed of wire and therefore is of light weight and of economical manufacture as well as being quickly and readily made. The opposite ends of the frame 10 are provided with hooks of any suitable structure as is shown at 21 through which may be engaged a rope or other suitable device by which the truck may be drawn.

In operation, the sack is placed upon the truck, which is constructed so as to be about nine inches from the ground and the truck is drawn along as the picker travels. When an uneven surface is reached the sections of the frame 10 yield thus raising only a portion of the bag and preventing the same from being thrown from the truck. When it is desired to transport the truck from one place to another the sections are turned over upon each other and the truck is lifted and carried in any suitable manner.

For the purpose of holding the frame 10 in an open position rods 22 are employed which are provided with snap hooks 23 for detachable engagement with the sides of the frame 10.

What is claimed is:—

1. A device of the class described comprising a longitudinal rod, a plurality of transverse rods having their inner ends secured about said longitudinal rod, V shaped brackets carried by said transverse rods, and wheels mounted in said brackets.

2. A truck comprising a substantially rectangular frame formed of a longitudinal rod, cross rods disposed on said longitudinal rod having the adjacent ends thereof engaged about said longitudinal rod, V shaped brackets supported upon said cross rods, the upper extremities of said brackets being engaged about said cross rods and wheels supported in the lower extremities of said brackets.

3. In a truck, the combination of a two section wire frame, a longitudinal rod for pivotally supporting said sections, a plurality of transverse rods disposed in pairs across said sections, a plurality of V shaped braces supported in pairs between said pairs of transverse rods, and of wheels disposed in the lower extremities of said V shaped braces.

In testimony whereof I affix my signature, in presence of two witnesses.

WILLIAM J. GOULD.

Witnesses:
EARL G. MORRIS,
DAVID E. HECKES.